Aug. 6, 1968     A. MAZURKEVICS ET AL     3,395,574
ENGINE TESTER MOUNTING SYSTEM
Filed Nov. 30, 1966     2 Sheets-Sheet 2
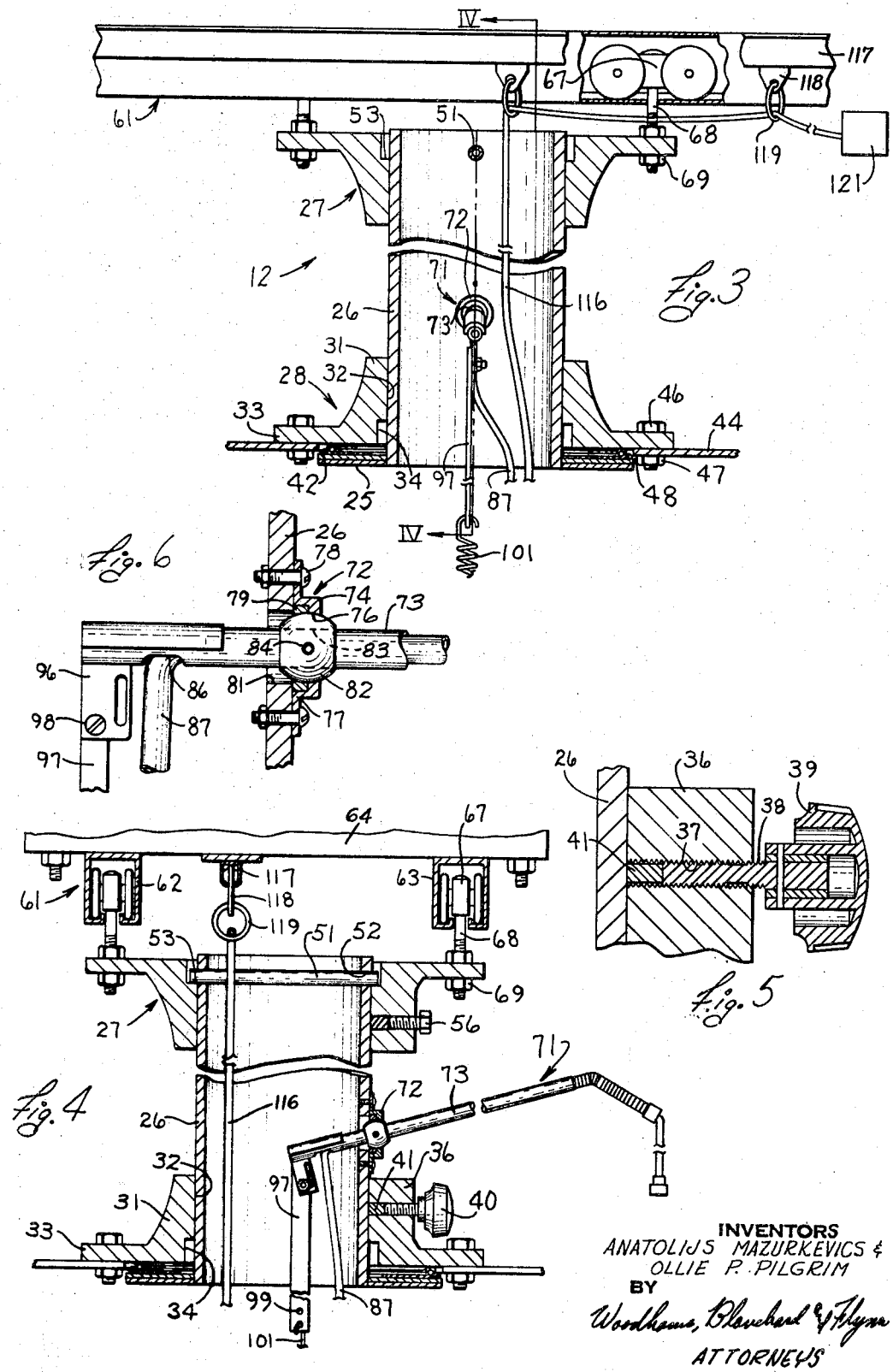
INVENTORS
ANATOLIJS MAZURKEVICS &
OLLIE P. PILGRIM
BY
Woodhams, Blanchard & Flynn
ATTORNEYS

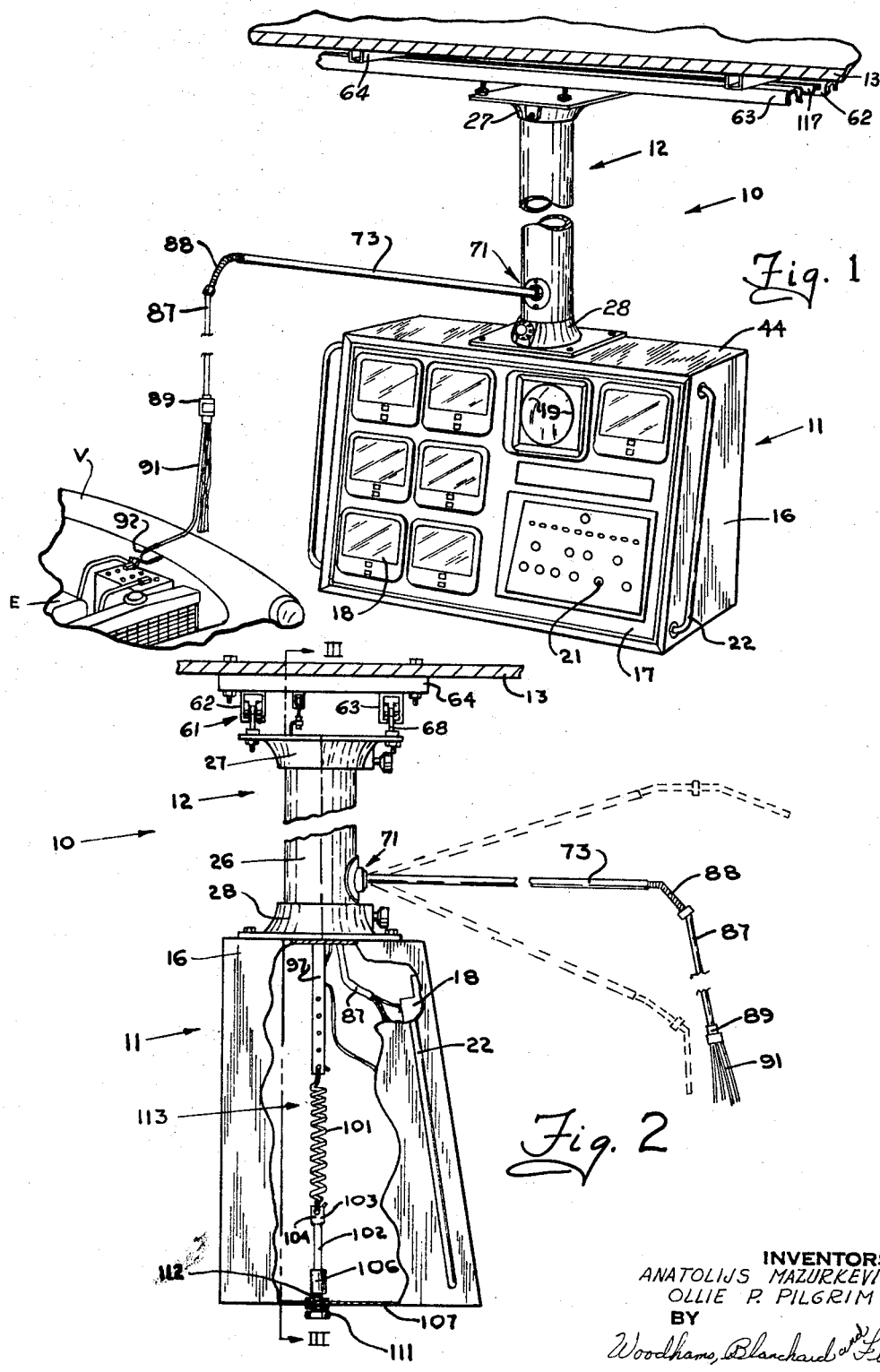

United States Patent Office

3,395,574
Patented Aug. 6, 1968

3,395,574
ENGINE TESTER MOUNTING SYSTEM
Anatolijs Mazurkevics, Kalamazoo Township, Kalamazoo County, and Ollie P. Pilgrim, Kalamazoo, Mich., assignors to Allen Electric and Equipment Company, Kalamazoo, Mich., a corporation of Michigan
Filed Nov. 30, 1966, Ser. No. 597,992
9 Claims. (Cl. 73—116)

ABSTRACT OF THE DISCLOSURE

A mounting system for an automotive engine tester having a test instrument display in a console which is supported by a vertical column and having adjustment means whereby the column may be rotatably adjusted with respect to the support means carrying the column. The mounting system also has an elongated conduit extending transversely away from the column and is swivelably mounted on same to support electrical conductors so that the free ends thereof are supported in a spaced relation from the console near an engine to be tested and, therefore, readily accessible for connecting said engine to be tested to the test instruments in the console.

---

This invention relates to a mounting system for engine testing apparatus and more particularly relates to a mounting system in which the test instruments and means carrying the engine connectors are readily reorientable, together and independently of each other, with respect both to the vehicle engine to be tested and to the operator of the apparatus.

The present device, although useable in a wide variety of applications, was particularly intended for use in an automotive diagnostic line. Automotive diagnostic lines generally comprise an elongated path along which vehicles to be tested are moved. The vehicles stop at each of a plurality of testing stations along the diagnostic line at which test equipment is disposed for checking corresponding parts of the adjacent vehicle, different portions of the vehicle being checked at each station.

A primary object and advantage of the diagnostic line is the ability to completely check the vehicles and still move vehicles therethrough at a relatively rapid pace, so as to maximize the number of vehicles passing through the line in unit time.

On the other hand, the line must be adapted to treat a wide variety of vehicles, in which the position and arrangement of the engine in the vehicle may differ markedly, as between cars and trucks or rear and front engined vehicles. Also, the vehicle may occupy any of a range of locations at the station. Further, differences in vehicles and their locations on the line may require the operator to change his position in order to perform the required test sequence. Thus, it will often be desirable to change the position of the test equipment in the station area to allow its connection to the vehicle and so that the operator may clearly view the instrument display thereof while conducting the test sequence.

In addition, different tests in a test sequence may require repositioning of the test equipment as different connections to the vehicle are required or as the operator shifts his position to carry out the required tests.

Previous test equipment consoles have generally not been capable of shifting location and orientation quickly, easily and precisely. In addition, the conductors connecting such previous consoles to the engine generally are otherwise unsupported and lie on the floor between the console and vehicle in the way of the operator. Consequently, previous test equipment has generally tended to hamper rapid and efficient running of the desired tests by the operator.

As a result, it is an object of the present invention to provide an engine tester mounting system for supporting a test instrument display and means for connecting said test instruments to the vehicle engine to be tested.

It is a further object to provide a system, as aforesaid, which is particularly adapted for use on an automotive diagnostic line and which is adapted to minimize interference by its presence with the rapid and correct completion of desired tests.

It is a further object to provide a system, as aforesaid, which is capable of laterally shifting the instrument display and connection means for use at different vehicle locations.

It is a further object to provide a system, as aforesaid, which is capable of supporting at a distance from the instrument display, the electrical conductors connecting the test instrument to the automotive engine being tested, which holds said conductors above the floor of the testing area and out of the way of the operator, and which allows the conductors to be moved over a wide vertical range and horizontal area for permitting ready connection of said conductors to the vehicle without requiring precise relative positioning of the vehicle and instrument display.

It is a further object to provide a system, as aforesaid, in which the instrument display and conductor supporting means are adjustable independently of each other and additionally may be shifted laterally or rotatably in combination to accommodate different positions of the vehicle and operator.

Further objects and purposes of this invention will be apparent to persons acquainted with apparatus of this general type upon reading the following specification and inspecting the accompanying drawings.

In the drawings:

FIGURE 1 is an oblique view of an engine tester mounting system embodying the invention.

FIGURE 2 is a partially broken side elevational view of the device in FIGURE 1.

FIGURE 3 is an enlarged sectional view taken on the line III—III of FIGURE 2.

FIGURE 4 is a sectional view taken on the line IV—IV of FIGURE 3.

FIGURE 5 is a enlarged fragment of FIGURE 4.

FIGURE 6 is an enlarged fragment of FIGURE 4 with the ball socket in central section.

Certain terminology will be used hereinbelow for convenience in reference and is not intended to be limiting. The terms "upwardly," "downwardly," "rightwardly" and "leftwardly" will refer to directions in the drawings to which reference is made. The terms "inwardly" and "outwardly" will refer to directions toward and away from the geometric center of the device embodying the invention and to indicate parts thereof. Said terminology will include the words above specifically mentioned, derivatives thereof and words of similar import.

*General description*

In general, the objects and purposes of this invention are met by providing a mounting system for an automotive engine tester including a console having a test instrument display. A hollow column extends upwardly from the console and means are provided which pendantly support the console from the column for relative rotative adjustment about the axis of the column. An elongated conduit is swivelably mounted on the column and extends outwardly therefrom beyond the console for supporting signal transmitting lines connected to the test instruments of the console for convenient connection to the engine to be tested. Further means are provided for pendantly supporting the column in a manner to allow rotation thereof and to allow translation thereof to provide for simultaneous movement of both said conduit and said console.

*Detailed description*

The apparatus 10 embodying the invention (FIGURES 1 and 2) generally comprises a console 11 and a mounting unit 12 which extends upwardly from the console and pendantly mounts same with respect to a fixed mounting surface such as the ceiling 13 of a room in which the apparatus 10 is disposed.

The console 11 comprises a housing 16 of any convenient type, here being generally rectangular in form. A display panel 17 defines one side wall of the housing 16. A plurality of test instuments here including meters 18, a cathode ray tube 19 and suitable controls 21 are displayed on the panel 17 for viewing and actuation by the operator for running various automotive engine tests and determining the results thereof. The bottom of the console is preferably located about three feet above the floor of the test area to allow convenient reading of the instruments and to place the controls thereon conveniently at the hand of the operator. Manually engageable bars 22 are preferably disposed on the ends of the housing 16 close to the display panel 17 to allow the operator to readily reposition the console.

The mounting unit 12 includes a vertically extended, hollow cylindrical column 26 of circular cross section having a circular, radially extending flange 25 at its lower end. The column 26 is provided with collars 27 and 28 (FIGURES 3 and 4) at its upper and lower ends, respectively. The collars 27 and 28 are preferably identical. Thus, a description of one will suffice for both. Considering the lower collar 28, same includes an axially elongated central portion 31 provided with a coaxial opening 32 through which the column 26 snugly but slideably extends. The collar 28 further is provided with a radial flange 33 at its lower end which, in the particular embodiment shown, is square in shape. The flange 33 is provided with an annular recess 34 coaxial therewith. The periphery of the central portion 31 of the collar 28 tapers along a smooth curve from the flange 33 to the inner end of the collar.

A buttress 36 is disposed at one point on the circumference of the central portion 31. A threaded opening 37 (FIGURE 5) extends radially through the wall of the central portion 31 at the buttress 36 for accommodating a locking device 40. The locking device 40 includes a threaded rod 38 threaded into the opening 37 and having a knob 39 fixed to the outer end thereof. A plug 41 is disposed in the threaded opening 37 inwardly of the threaded rod 38. The plug 41 is preferably of a soft, frictional material. The plug prevents the inner end of the thread rod 38 from marring the surface of the column 26 while acting to prevent relative rotation of the collar 28 and column 26 upon tightening of said threaded rod 38 thereagainst.

The collar 28 (FIGURES 3 and 4) is axially supported upon the flange 25 of the column 26 by a suitable axial thrust bearing 42 of any convenient type, here a "lazy susan" bearing having a ball race of substantial diameter. The flange 33 of the lower collar 28 is secured to the upper wall 44 of the console housing 16 by any convenient means, here bolts 46 and nuts 47. The mounting unit 12 is preferably centrally located on the upper wall 44 of the console. An opening 48 is provided in said upper wall for allowing the column 26, flange 25 and bearing 42 to be loosely downwardly inserted therethrough and for allowing communication between the interior of the housing 16 and the interior of the column 26. Thus, the lower flange 25 of the column 26 rotatably supports the housing 16 thereon and the knob 39 may be adjusted to prevent or allow such rotation.

The upper collar 27 is oppositely oriented on the column 26, the unflanged ends of the collars 27 and 28 thus being opposed.

A support rod 51 extends diametrically through openings 52 adjacent the upper end of the column 26. The ends of the support rod 51 extend beyond the periphery of the column 26 and rest upon the upwardly facing annular step surface 53, defined by the annular recess 34 in the flanged end of the upper collar, to support the column 26 and, hence the console 11, pendantly from the upper collar 27. The ends of the rod are slideable circumferentially on the step 53 to allow rotation of the column with respect to the upper collar 27. A locking device 56, preferably identical to the locking device 40 of the lower collar 28, is provided on the upper collar 27.

The mounting unit 12 is supported for lateral movement on a track assembly 61. The track assembly 61 (FIGURES 3 and 4) comprises a parallel pair of tracks 62 and 63 carried by a fixed bed 64, here affixed to the underside of ceiling 13 of the room in which the apparatus 10 is disposed. The tracks may be of any conventional type and are here of generally C-shaped, downwardly opening cross section. Wheeled trucks 67, of any conventional type, are disposed within each of the tracks 62 and 63, the wheels of such trucks bearing on the lower flanges of the tracks to support said trucks for movement longitudinally of said tracks. The tracks 62 and 63 pass over opposed edges of the flange of the upper collar 27. Mounting rods 68 are fixed to and extend downwardly from the trucks 67. The mounting rods are threaded at their lower ends and extend through suitable openings, not shown, in the corners of the flange on the upper collar 27, being affixed thereto by nuts 69. Thus, the console 11 and column 26 depend from the tracks 62 and 63 and are shiftable longitudinally thereof.

A cable support, generally indicated at 71 (FIGURES 3 and 4) is swivelably supported on the column 26 above and adjacent the lower collar 31. The cable support includes a ball joint 72 and an elongated, rigid and hollow conduit 73 swivelably carried by said ball joint. The ball joint 72 (FIGURE 6) includes a socket member 74 having a central opening 76, the wall of which is spherically shaped. The conduit 73 is loosely receivable in the opening 76. The socket member has an outwardly extending flange 77 which conforms to and is secured to the periphery of the column 26 by screws 78. The peripheral wall of the column 26 is provided with an opening 81 in back of the socket member 74 through which the conduit 73 loosely passes into the interior of the column 26.

A ball member 82 has a central opening indicated in broken lines at 83 through which the conduit 73 snugly extends. The ball member is fixed, as by a set screw 84, to the conduit 73. The ball member is snugly but swivelably received in the spherical central opening 76 of the socket member 74 whereby the conduit 73 is swivelably mounted on the column 26. The socket member 74 preferably is of two-piece construction and in the embodiment shown is provided with an insert 79 separable therefrom along a diametral plane of the spherical central opening 76 for allowing removal of the ball member 82 from the socket member 74.

An elongated opening 86 is provided in the underside of the hollow conduit 73 and adjacent the inner end thereof. Electrical conductors, preferably in the form of a flexible cable 87 (FIGURES 2 and 6) are suitably connected to the instruments and controls on the display panel 17 and extend upwardly therefrom into the opening 86 in the conduit 73 and thence outwardly along the conduit out of the outer end thereof. The outer end of the conduit is provided with a hollow spring 88 coaxially coupled thereto as seen in FIGURES 1 and 2. The cable 87 extends beyond the spring 88, the spring 88 protecting the cable from kinking at the end of the conduit 73. Smaller sets of conductors or individual conductors 91 extend from a releasable connector 89 terminating the outer end of the cable and are in turn preferably terminated with suitable connecting elements 92 of any conventional nature for allowing convenient connection to predetermined points on the vehicle V.

The inner end of the conduit 73 is provided with a downwardly extending plate 96 (FIGURE 6) secured rigidly thereto as by welding. An elongated, depending link 97 is pivotally secured to the plate 96 by any convenient means such as a screw and nut, as indicated at 98. The lower end of the link 97 is provided with a series of longitudinally spaced holes 99 (FIGURE 4) into any desired one of which the upper end of a tension spring 101 may be inserted. A tubular member 102 is flattened at its upper end 103. The flattened upper end 103 is provided with a suitable opening 104 for receiving the lower end of the spring 101. The tubular member 102 extends downwardly from the spring and is provided with an enlarged internally threaded fitting 106 at its lower end, the fitting 106 being spaced somewhat above the bottom wall 107 of the housing 16. A locking device 111, preferably identical to the locking devices 40 and 56 illustrated in FIGURE 4, has its threaded shaft 112 extending upwardly through a suitable opening in the bottom wall 107 into threaded engagement with the fitting 106. The link 97, spring 101, tubular member 102 and locking member 111 form a biasing assembly generally indicated at 113 for urging the conduit 73 in a clockwise direction as shown in FIGURE 2 to resiliently raise the outer end thereof and resiliently maintain said conduit essentially in the plane of the column axis. This biasing force on the conduit 73 may be increased in steps by inserting the upper end of the spring 101 in other ones of the holes 99 further upwardly along the link 97. A continuous, fine increase may be made in the biasing force by threading the locking member 111 further into the fitting 106 thereby to draw the link 97 downwardly and so tension the spring 101.

Connection may be made to the console for conducting signals from the tested vehicle to further instruments not shown and not mounted on the console, for illuminating the meters 18, for powering the cathode ray tube or for other purposes by any convenient means preferably including a second cable 116 (FIGURE 3). The second cable 116 extends upwardly out of the console through the column 26. A secondary track 117 lies between and parallels the tracks 62 and 63 (FIGURE 4). A plurality of carriers 118 are adapted to roll longitudinally on the secondary track 117. The roller carriers 118 have downwardly extending eyelets 119 through which the power cable 116 is supportedly looped. The cable 116 thus extends from the upper end of the column 26 along the secondary track 117 to any convenient termination 121 (FIGURE 3), which may be a suitable electrical power source where the cable 116 is a power cable.

*Operation*

In use, the console 11 may be moved along the tracks 62 and 63 to a desired position opposite the vehicle V to be tested. If desired, the direction in which the display panel 17 and conduit 71 face may be changed by loosening the locking device 56 and rotating the column 26 and therewith the console 11. During such a rotative adjustment, the ends of the support rod 51 slide circumferentially along the step surface 53 of the upper collar 27. Such an adjustment will normally be relatively rarely required i.e., usually not more than once for every vehicle tested.

If desired, the locking device 40 may be loosened and the console 11 rotated on the bearing 42 with respect to the column 26 to position same for convenient viewing by the operator during the testing of the adjacent vehicle V. If desired, the locking device 40 may be left in its untightened position whereby the console may be freely rotated on the column at any time during the testing sequence so as to maintain the instrument display continually visible to the operator as the operator moves about in conducting various tests on the engine E of the vehicle V.

As stated above, the biasing assembly 113 tends to raise the outer end of the conduit 73 and maintain same coplanar with the column axis. The biasing force is a relatively light one, however, and is easily overcome simply by pulling downwardly or to the side upon the cable 87 or on one or more of the conductors 91 extending therefrom. Thus, the conductors 91 may be readily connected by the operator by means of the individual connectors 92 to corresponding points on the engine E of the adjacent vehicle V to be tested. When such connections are made, the biasing force on the conduit 73 tends to maintain the conductors 91 and the cable 87 in a raised position extending upwardly from the vehicle and out of the way of the operator. In fact, the outer end of the conduit 73 is normally maintained above the head of the operator so that he may walk freely around the vehicle and console without interference by the conduit or by the cable extending therefrom.

With the apparatus 10 embodying the present invention, it is possible for the operator to be seated in the driver's position in the test vehicle V or to be at any point near or in the vehicle and still have a full close view of the display panel 17 with all connections to the vehicle engine.

It will be apparent that the apparatus 10 may be used with vehicles in which the engine may be located in the front or the rear of the vehicle, may be positioned relatively high or relatively low in the vehicle or may be oriented in a variety of positions in the vehicle, all without affecting the use of the apparatus.

Although the apparatus 10 is readily adapted to test a series of vehicles moving from station to station in a diagnostic line, the tracks 62 and 63 allow the console 11 and column 26 to be moved along a stationary line of vehicles for sequentially testing same. As the console 11 is moved along the tracks 62 and 63, the power cable 119 is maintained at all times well above the console and out of the way of the operator of the apparatus 10 and at the same time is prevented from self-entanglement.

Although a particular preferred embodiment of the invention has been disclosed hereinabove, it will be understood that variations or modifications thereof lying within the scope of the appended claims are fully contemplated.

The embodiments of the invention in which an exclusive property or privilege is claimed are defined as follows:

1. A mounting system for an automotive engine tester, comprising the combination:
   a console having a test instrument display;
   a column upstanding from said console and means pendantly supporting said console from said column for rotative adjustment about the axis of said column;
   an elongated conduit extending transversely away from said column and means swivelably mounting same on said column;
   electrically conductive means supported by said conduit whereby the free ends thereof are supported in a spaced relation from said console and readily accessible for connecting an engine to be tested to the test instruments in said console;
   support means carrying said column in depending relationship with respect thereto and adjustment means whereby said column may be rotatably adjusted with respect to said support means.

2. The device defined in claim 1 including track means and means slideably supporting said support means in depending relationship on said track means for reciprocation therealong.

3. The device defined in claim 1 in which said means pendently supporting said console comprises a collar snugly but rotatably surrounding the said column, a radial flange fixed to the lower end of said column and axial thrust bearing means disposed between said collar and said flange for rotatably supporting said collar with respect to said column, said collar including a radially extending flange secured to the upper wall of said console and including means adjustable to lock said collar in fixed position circumferentially of said column.

4. The device defined in claim 1 in which said means swivelably mounting said conduit on said column includes a ball member fixed to said conduit intermediate the ends thereof and a socket member fixed to said column intermediate the ends thereof, said column having an opening therethrough at said swivel member, said socket member having an opening therethrough defining a spherical surface in which said ball member is swivelably mounted.

5. The device defined in claim 1 in which one end of said conduit extends into the interior of said column and is provided with means tending to hold the outer end of said conduit in an elevated position vertically centered on said means swivelably mounting same on said column, said biasing means including a link pivotably fixed to said inner end of said conduit, tension spring means secured to said link adjacent to the lower end thereof, a lower member extending upwardly from adjacent the bottom wall of said console toward said spring means and an adjustment device axially fixed with respect to said bottom wall of said console and axially adjustably engageable with said lower member for tensioning said spring.

6. The device defined in claim 1 in which said support means comprises a collar snugly but rotatably disposed on the upper end of said column and having an outwardly facing central recess having an annular step surface, said support means further including an elongated rod extending diametrally through said column adjacent the upper end thereof, the ends of said rod extending radially beyond said column and resting upon the step surface of said recess to support said column for rotation on said collar, said collar further including means adjustable for locking said column circumferentially thereto, said collar having a radially extending flange at its outer end adapted for supporting said collar, and therewith said column.

7. A mounting system for an automotive engine tester, comprising the combination:
    a console comprising a housing provided with a test instrument display panel;
    a support disposed in spaced relationship above said console;
    an upstanding tubular column disposed between said support and said console, said column being provided with similar collars at the opposite ends thereof, the upper one of said collars being affixed to said support and the lower one of said collars being affixed to said console, said column further being provided with a radial flange at the lower end thereof disposed below the lower one of said collars;
    an axial thrust bearing disposed between said flange and the lower one of said collars for rotatably carrying said console on the lower end of said column;
    a rod extending diametrally through and beyond the periphery of said column and an upwardly opening recess in the upper end of said upper collar adapted to loosely receive said ends of said rod to allow rotation of said column with respect to said upper collar;
    means adapted for fixing said collars with respect to said column;
    cable means arranged for connection between test instruments in said console and points on the vehicle to be tested;
    a swivel joint disposed on said column between said collars and adjacent the lower one of said collars and conduit means extending through said swivel joint from the interior of said column to the exterior thereof;
    means within said column and console connected between the inner end of said conduit and said console for resiliently urging the outer end of said conduit upwardly so as to tend to maintain said outer end and said cable means extending therefrom out of the way of the operator.

8. The device defined in claim 7 in which said means for holding said collars fixed with respect to said column, each comprise a screw member threadedly engaging said collar and extending radially thereof and plug means slideably disposed between said column and said screw member for being pressed against said column in response to tightening of said screw, said plug being of a material softer than said column to avoid marring of the periphery of said column upon tightening of said screw.

9. The device defined in claim 7 in which said support comprises a pair of tracks disposed above said upper collar and trucks supported on said tracks for longitudinal movement therealong, said trucks pendently supporting said upper collar; and including
    a secondary track paralleling said first-mentioned tracks and carrying a plurality of sliders thereon;
    a power cable connected between a source of power spaced from said column and supported on said sliders, said power cable extending downwardly into said column and thereby into said console for supplying power to test instruments therein.

References Cited

UNITED STATES PATENTS

| | | | |
|---|---|---|---|
| 1,052,889 | 2/1913 | Cohn | 248—324 |
| 1,123,757 | 1/1915 | Knerr | 248—324 |
| 1,785,518 | 12/1930 | Higgins | 174—69 X |
| 3,238,771 | 3/1966 | Myrtetus et al. | 73—117 |

RICHARD C. QUEISSER, *Primary Examiner.*

JERRY W. MYRACLE, *Assistant Examiner.*